Oct. 28, 1952 T. C. POULTER 2,615,523
SEISMIC EXPLORATION
Filed July 2, 1949 5 Sheets-Sheet 1
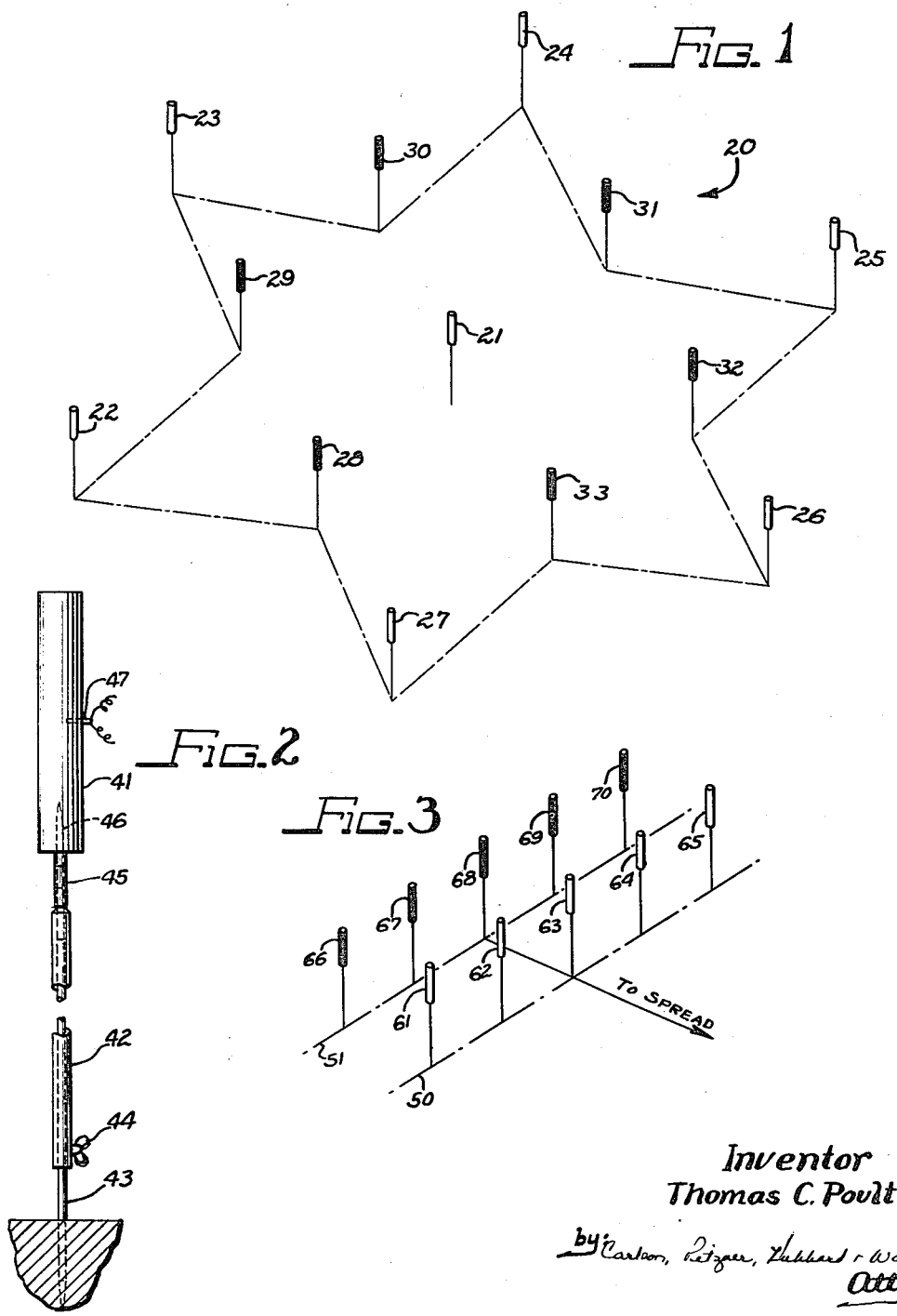
Inventor
Thomas C. Poulter Oct. 28, 1952 T. C. POULTER 2,615,523
SEISMIC EXPLORATION
Filed July 2, 1949 5 Sheets-Sheet 2
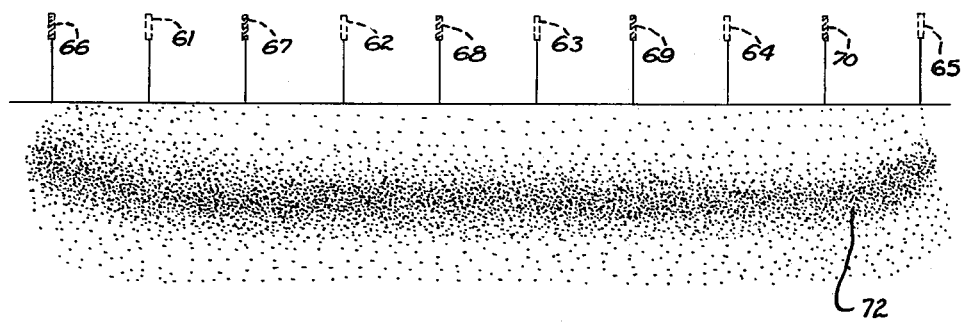
Fig. 4
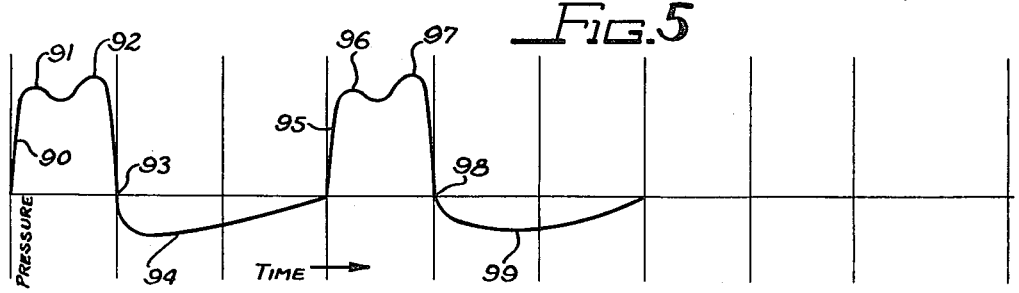
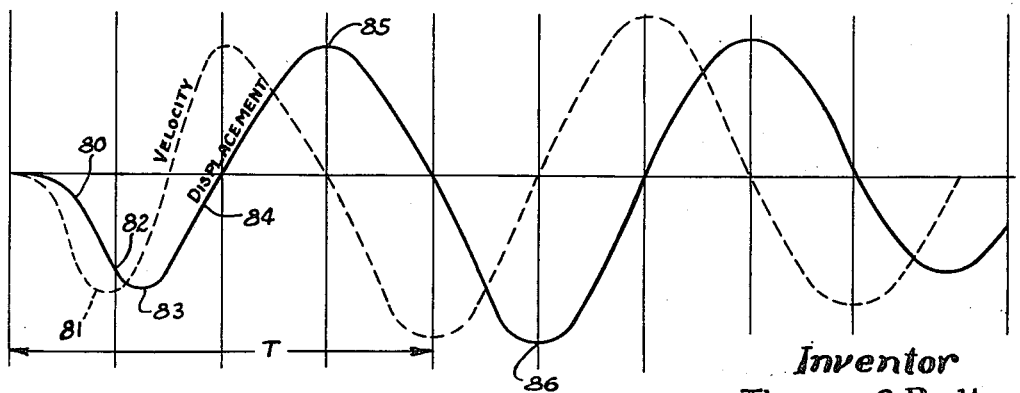
Fig. 5
Fig. 5a
Inventor
Thomas C. Poulter
by Carlson, Pitzau, Hubbard & Wolfe
Attys.

Oct. 28, 1952 — T. C. POULTER — 2,615,523
SEISMIC EXPLORATION
Filed July 2, 1949 — 5 Sheets-Sheet 3

Inventor
Thomas C. Poulter

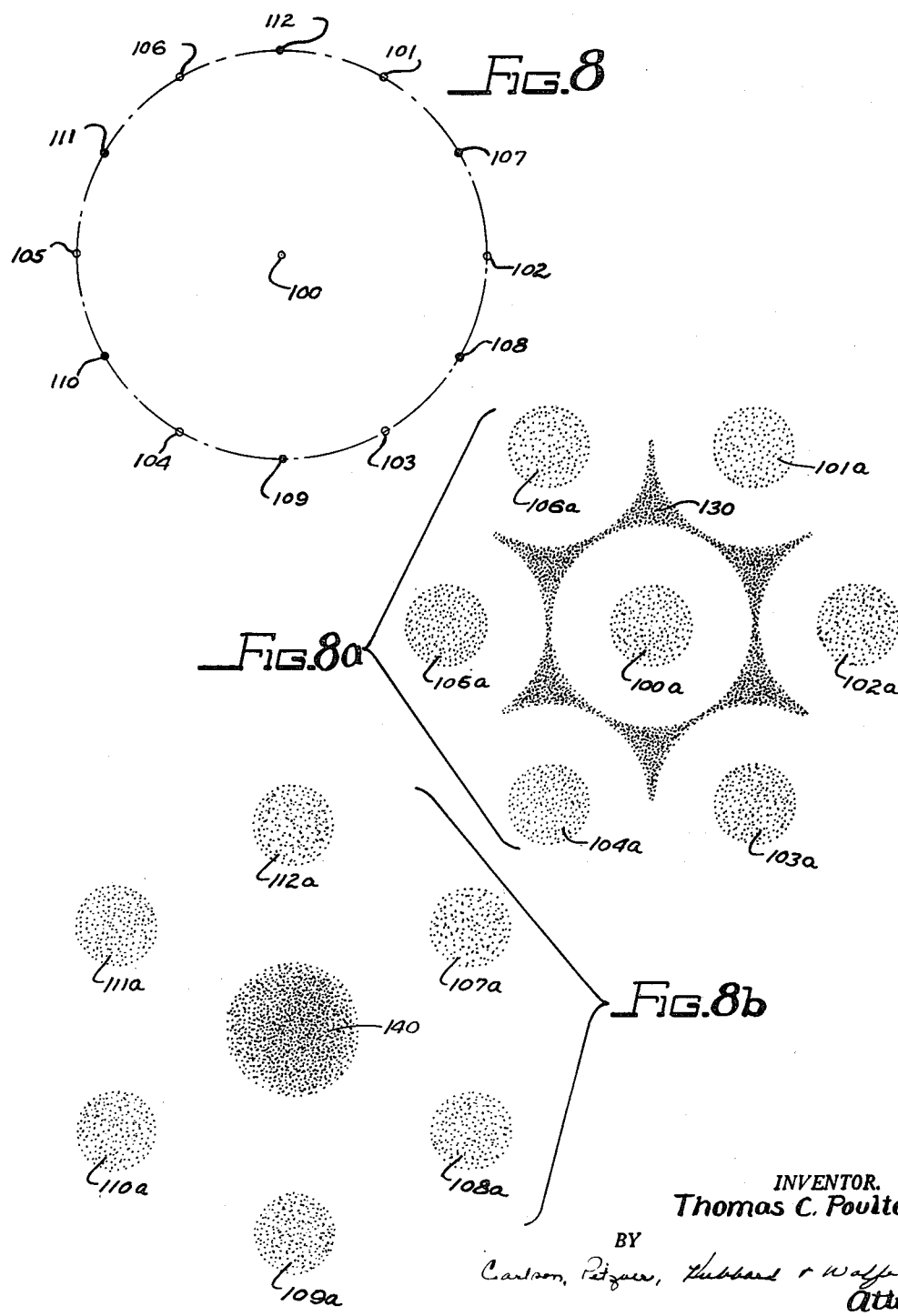

Oct. 28, 1952 — T. C. POULTER — 2,615,523
SEISMIC EXPLORATION
Filed July 2, 1949 — 5 Sheets-Sheet 5
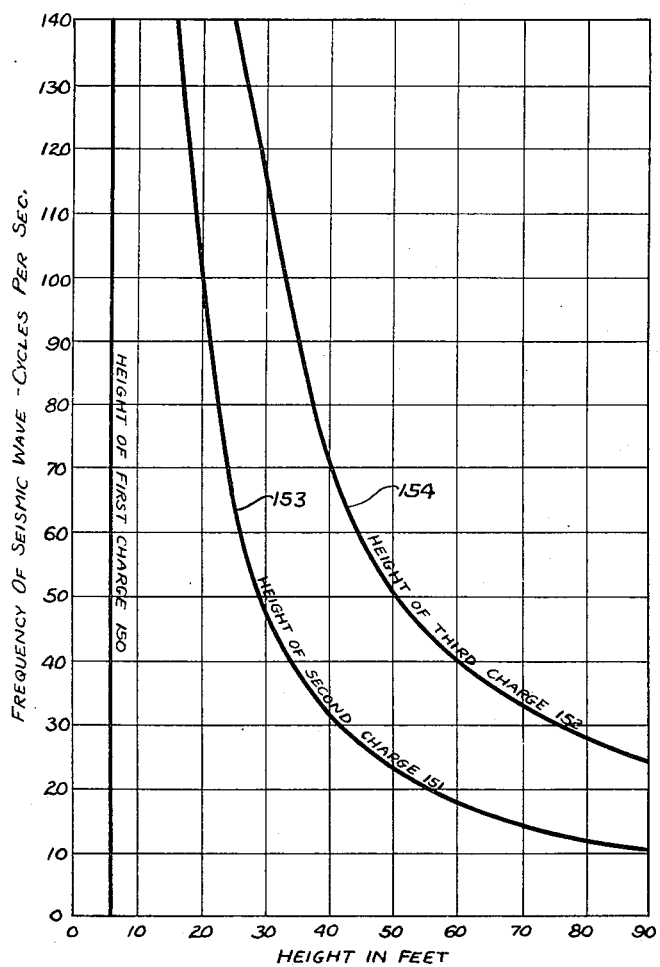
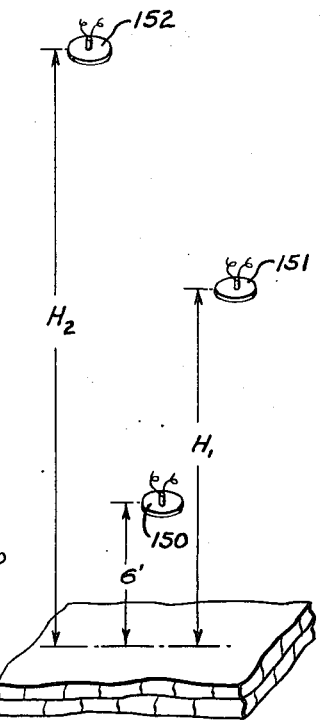
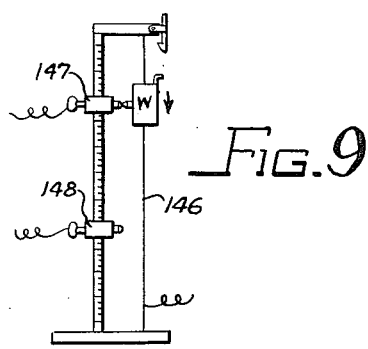
INVENTOR.
Thomas C. Poulter Patented Oct. 28, 1952

2,615,523

UNITED STATES PATENT OFFICE 2,615,523

SEISMIC EXPLORATION

Thomas C. Poulter, Palo Alto, Calif., assignor to Institute of Inventive Research, San Antonio, Tex., a trust estate of San Antonio Application July 2, 1949, Serial No. 102,822

20 Claims. (Cl. 181—.5)

The present invention relates to geophysical exploration and more particularly to the formation of an improved seismic wave for obtaining reflections from submerged horizons.

It is a general object of the present invention to provide an improved method of arranging and firing a plurality of explosive charges so as to produce a seismic wave in the earth which is coordinated with the natural period of earth vibration.

It is an object of the present invention to provide an arrangement of explosive charges which are fired sequentially in such a manner as to generate in the earth a plurality of wave fronts with a time interval between them which substantially matches the natural period of the earth in the region under study and which results in more efficient energy transmission.

It is another object of the present invention to provide a plurality of patterns of explosive charges arranged above the surface of the earth and fired in sequence with a predetermined time interval to set up in the earth a series of wave fronts which are coordinated with the observed period of vibration most readily transmitted by the earth.

It is an object of the invention in one of its aspects to provide an improved air-fired charge array for generating a plurality of wave fronts and applying them in sequence to the surface of the earth over a broad but fairly well-defined area while eliminating the necessity for sequence timing apparatus.

It is a further object to provide an arrangement of explosive and method of use which results in an oscillograph trace which is singularly free from distortion and extraneous vibrations thereby permitting easy interpretation. It is a more detailed object of the invention to provide an improved method of utilizing explosive to permit penetration to deeply submerged layers with minimum attenuation and using a total weight of explosive which is much smaller than that employed in conventional seismic practice.

In one of its aspects it is an object of the invention to provide a procedure for arranging patterns of explosive charges and firing the same in timed sequence which enables the duration of the forces applied to the earth as well as the interval between them to be coordinated with the desired frequency of earth vibration.

It is still another object to provide an improved method of employing explosive for seismic purposes which is well adapted for obtaining reflections from horizons submerged under water without endangering the fish and other animal plant life in the water, and which is also well adapted for propagating a seismic wave through snow, loose earth, sand or other granular surface media difficult to penetrate by ordinary means.

Other objects and advantages of the invention will become apparent as the discussion proceeds taken in connection with the accompanying drawings, in which:

Figure 1 shows an arrangement of air-fired explosive charges adapted for sequential firing in groups in accordance with the present invention.

Fig. 2 is a detailed elevation of a charge assembly suitable for use in Fig. 1.

Fig. 3 shows an in-line arrangement of charges for sequential firing.

Fig. 4 is a diagrammatic showing of the wave front set up in the earth as a result of firing the charges in Fig. 3.

Figs. 5 and 5a show graphically the pressure thrusts applied to the earth and the displacement and velocity of the earth which results.

Fig. 8 is a plan view of the charge layout of Fig. 6.

Figs. 8a and 8b show the area of first impact and area of second impact, respectively, for the pattern of Fig. 8.

Fig. 9 is a more or less schematic representation of a timing device for sequence firing.

Fig. 10 shows an explosive array set up in accordance with one aspect of the invention.

Fig. 11 is a graphical aid in using the charge array of Fig. 10.

Figure 6:
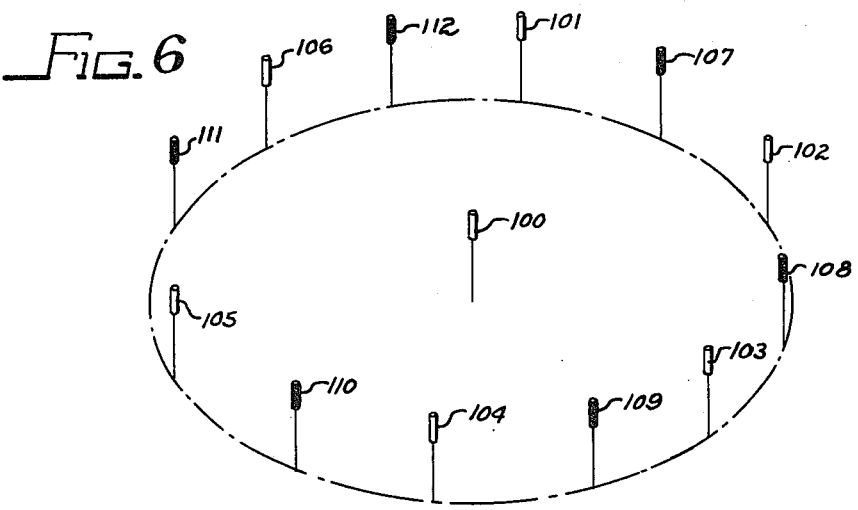
Fig. 6 shows in perspective another arrangement of charges for sequential firing in two groups and enabling the duration of impact to be controlled.

While the invention is susceptible of various modifications, I have shown in the drawings and will herein describe in detail only certain embodiments of the invention; it is to be understood, however, that I do not intend to limit the invention by such disclosure but aim to cover all modifications and alternative charge arrays and methods falling within the spirit and scope of the invention as expressed in the appended claims.

In the prior art as represented by Patent 2,156,198 to Scherbatskoy issued April 25, 1939, there is disclosed a method of generating waves in the earth for geophysical prospecting purposes which comprises successively detonating a plurality of explosive charges at substantially the same point and at the same frequency as the frequency of the earth waves most efficiently transmitted through the earth at the location being prospected. In practice it is found that the results obtainable using this scheme fall far short of those which might be expected and, consequently, introduction of such method has not served to displace to any noticeable extent the firing of charges in shot holes in the conventional manner. Although the intention is to shape the imparted wave to a frequency which is efficiently transmitted, nevertheless seismograms taken in the field show that the received energy is not peaked to any substantial extent at the desired frequency. According to my observations this may ve explained on several grounds. In the first place when charges are fired in the earth it can be demonstrated that 95 per cent or more of the energy of the explosion is dissipated uselessly by the crushing effect of the explosion on the surrounding earth structure and by thermal losses. Such crushing combined with the rush of gas through the earth following the blast gives rise to many spurious high frequencies which in addition to absorbing large amounts of energy confuse the record and make interpretation extermely difficult. Even more important the sustained pressure of the gas in the hole causes a heaving of the earth around the hole and the setting up of a so-called ground roll of extremely high amplitude and at a low frequency of about 10–15 vibrations per second. The ground roll is bad enough when only a single charge is fired. The situation is greatly worsened when two or three charges are fired in the earth at spaced intervals since it still further prolongs the period of high gas pressure in the hole. The net result is that the frequency characteristic of sequence firing appears only as a low amplitude ripple superimposed on the high amplitude, low frequency ground roll.

A further drawback of the teaching in the prior art relates to the interval between the successive explosions. It has been assumed by those in the field that a wave of a certain frequency could be set up by firing two charges with time interval between them equal to the period of the desired wave. As will be more fully covered in the discussion which follows I have found that the relationship between the interval separating the explosions and period of the desired seismic wave should be a ratio which is substantially less than 1:1 in order to achieve any substantial transfer of explosive energy to the earth at the desired frequency.

Turning now to the drawings, Figure 1 shows a charge array indicated generally at 20 which includes 13 charges arranged equidistant from one another in the shape of a star. These charges are designated 21—33 respectively. Individual charges are elevated above the ground as shown in greater detail in Fig. 2. The charges are so formed as to impart a blow or impact to the earth over a relatively broad area. In the present embodiment a representative charge indicated at 41 is cylindrical in shape end supported above the surface of the earth on a tubular post 42. The height of the charge is adjustable by telescoping the post 42 over a rather lengthy steel stake 43, a thumb screw or the like 44 serving to hold the two members in a desired extended position. The post 42 is necked down at its upper end to accommodate a cardboard ferrule 45 and a light wooden dowel 46 on which the charge is impaled. The explosive may be any of the conventional high velocity types such as TNT, RDX or 60% HV seismograph gelatin. A cap 47 is inserted into the middle of the charge and connected in series with the caps in other charges.

In practicing the present invention means are provided for applying to the earth over a broad but well-defined area a series of two or more distributed force impulses related in a novel manner to the natural period of earth vibration in the region under study.

Pursuant to the above, the charges within the pattern 20 are divided into two groups, charges in each of the groups being fired simultaneously but with a time interval between the explosions. More particularly, two groups of charges covering generally the same region of the earth's surface are fired sequentially with a time interval between them which is substantially equal to three-fourths of the natural period of earth vibration. For purposes of convenience the pattern 20 may be considered to be made up of two sub-patterns, namely, the charges 21—27 which include the central charge and the outer ring of charges, and the charges 28—33 inclusive which form an inner ring of equally spaced charges.

In accordance with another aspect of the invention the respective charges of each group are arranged sufficiently closely together so that they act in unison to exert a piston-like thrust on the ground but with the groups far enough apart so that there is no possibility that the firing of the first group will cause premature explosion or countermining of the second.

An alternative form of pattern is shown in Fig. 3 where the charges are arranged in groups along the lines 50, 51 oriented perpendicular to the direction of the spread. The charges in the first group are designated 61—65 and those in the second group 66—70.

The action of the present arrangements of charges in setting up successive wave fronts will be apparent upon inspection of Fig. 4 which shows a cross section of the earth shortly after both groups of charges have been fired. Charges 61—65 are fired first to set up a wave front 71 and after a definite time interval the charges 66—70 are fired together to set up a second wave front 72, the two wave fronts remaining spaced apart as they travel down through the earth. Since the seismic waves are compressional in nature, the wave fronts may be conveniently represented by stippling, with the density thereof being proportional to the pressure. Since the charges of a given group are arranged quite close together, they act to reinforce one another to apply a rather sustained piston-like thrust over a broad but well-defined area of the earth. For a more detailed discussion of the mechanics by which this sets up a seismic wave, reference is made to my copending application Serial No. 102,821, filed concurrently herewith.

The wave fronts proceed rather flatly until they are reflected from a submerged horizon, after which they proceed upwardly to a geophone spread (not shown). The latter should be located in a position spaced from the shot area when it is desired that the reflections of interest be received before the arrival of the air wave.

The manner in which the pressure wave is coordinated with the natural period of the earth in making use of the present invention will be apparent upon comparing the curve of pressure on the earth in Fig. 5 with the curve of earth displacement and velocity set forth in Fig. 5a, the horizontal or time scale being in each case the same. The displacement variation is indicated by the curve 80 and the velocity variation by the curve 81 which is shown dotted. The latter are curves corresponding to natural earth movement over the path of the desired reflection and do not pertain merely to the material in the weathered layer. In both Figs. 5 and 5a the relationship, although based upon observed data, should be considered approximate.

Since practicing the present invention requires knowledge of the natural frequency of the earth over the reflection path, brief consideration will be given to the procedure for obtaining this information. A shot point and geophone spread are established, the filtering at the recording unit being such as to admit a broad band of frequencies lying between about 30 and 80 vibrations per second. The shot is preferably made by firing one or more charges in the air a short distance above the surface. The resulting traces will be found to have a predominant period of vibration which may be read off directly merely by observing the distance (expressed in units of time) between adjacent chosen peaks in a given trace. It will be found in practice that the period is not constant but varies somewhat from point to point along the trace. For maximum accuracy, therefore, the period is read from that portion of the trace which shows a desired reflection either clearly or indistinctly. If no reflections at all are found on the test record, the average period over a chosen range of depth may be used. When making a continuous survey it is not necessary to make a special test shot to determine what frequency should be set up and this data may instead be obtained from the record of the previous shot. The observed natural period of earth vibration is indicated at "T" in Fig. 5a. This will normally differ from the natural period of the weathered layer, although the elasticity of the weathered layer is usefully employed, as will be apparent as the discussion proceeds.

When the charges 61—65 are fired, the pressure rises rather abruptly along the pressure curve 90 reaching a peak 91. Due to the close arrangement of the charges 61—65, the pressure on the earth does not drop to any appreciable extent but, because of the interaction of the shock waves and gas from neighboring charges, is sustained and will normally rise to a second peak 92 before dropping back to atmospheric pressure 93. In practicing the present invention I prefer to use charges of such weight, height and spacing that the pressure lasts for an interval which is between $\frac{1}{16}$ and approximately ¼ of the natural period of earth vibration and which is followed immediately by vacuum persisting about twice this long. In the present instance such vacuum is indicated by the lower loop 99 of the curve 90.

During the time that pressure is being applied to the earth, the earth starts out from rest and accelerates in a downward direction as indicated at 82. At the latter point the pressure is terminated but the earth continues to move slightly due to its inertia until a maximum downward displacement 83 is reached. During this time interval the earth velocity, as indicated by the curve 81, has increased from zero to a maximum and has fallen again to zero. Because of the natural elasticity of the earth and as a result of the upward tug of vacuum, the earth springs upwardly along the portion of the curve 84 reaching a maximum upward displacement 85. In practicing the invention, I fire the second group of charges 66—70 at this point in the cycle of earth movement. The curve of pressure shown at 95 is substantially the same as that previously discussed, the pressure rising to a first peak value 96 and normally rising to a second peak 97 before dropping back to atmospheric. After the pressure returns to atmospheric, as indicated at 98, the pressure is replaced by vacuum as indicated by the lower loop 99 of the pressure curve. Application of pressure at the point 85 causes the earth again to move downwardly, thereby completing the first full wave of earth movement and setting up a second wave front.

It will be noted that the pressure portion of the impulse represented by curve 95 does not persist for the full ensuing half cycle of downward earth movement but is replaced by vacuum before such movement is completed. It might be expected that the earth displacement would fall short because of this. Studies have shown, however, that once the earth has started moving displacement is dependent upon impulse or the force-time product as well as the duration of the force. As a result, the displacement of the earth reaches, or substantially reaches, the point 86. Although the foregoing explanation has been applied to the setup of charges shown in Fig. 5, it will be understood that it applies with equal force to the arrangement disclosed in Fig. 1. Both types of pattern are applicable to reflection shooting. However, in refraction shooting the arrangement of Fig. 3 is preferred since the energy is largely concentrated in a vertical plane which lies perpendicular to the lines 50, 51 and which coincides with the spread of geophones.

In accordance with another aspect of the invention the duration of the pressure may be made greater for the second group of charges than it is for the first. This is acomplished by so arranging the charges of the first group that the shock wave fronts and expanding gas set up thereby interact upon one another over the first quarter cycle of desired earth movement and arranging the charges of the second group so that the pressure is sustained and interaction is not completed for a half cycle of earth movement.

The manner in which this prolongation is accomplished will be made clear upon inspection of the modified pattern of Fig. 6 whose characteristics are set forth in Figs. 7 and 7a. The charges in the pattern are divided into two groups, the first including a central charge 100 and concentrically arranged charges 101—106 and the second including the charges 107—112 lying between them. For convenience the charges are shown in plan view in Fig. 8 with the area primarily affected by the charges shown in Figs. 8a and 8b.

Upon exploding the first group of charges, the pressure at the earth rises as indicated by the initial peak 121 of the pressure curve 120. This pressure is applied to the earth in regions generally below the charges, the areas being designated in Fig. 8a by the reference numerals 100a—106a respectively. The firing of the charges sets up ltaerally expanding shock wave fronts, each followed by a mass or bubble of high pressure gas. These collide and interact at the boundary regions between adjacent charges to produce a rather intensified pressure indicated at 122 in Fig. 7 and covering primarily the area 130 in Fig. 8a. This pressure is terminated within the first one-quarter cycle of desired earth movement as indicated at 123 and vacuum is applied to the earth over the interval indicated by the lower loop 124 of the pressure curve.

Figure 7:
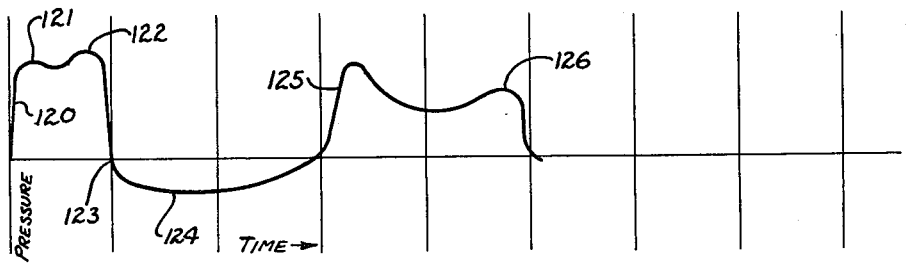
Figs. 7 and 7a show pressure and displacement velocity graphs for the pattern of Fig. 6.
Figure 7A:
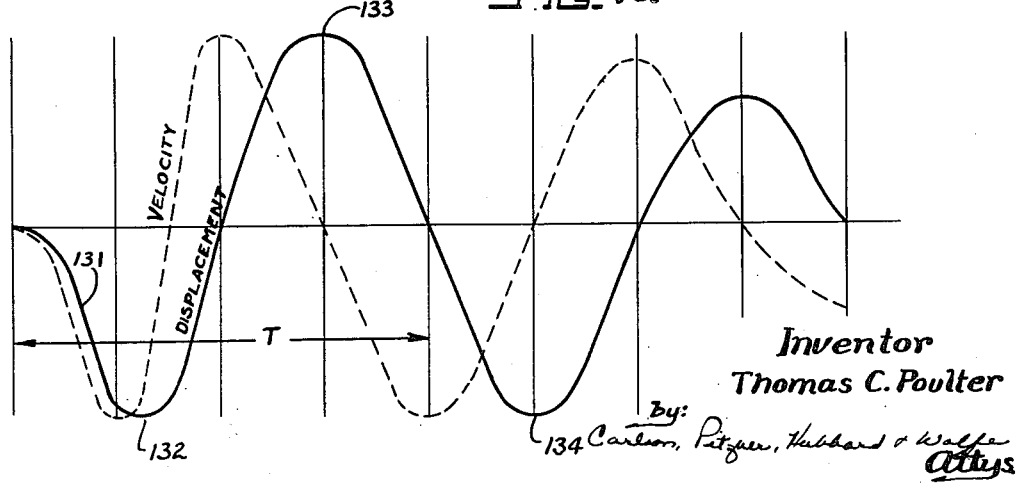

Referring to Fig. 7a, the movement of the earth which results is shown by the curve 131, the earth being displaced downwardly during the first quarter cycle and over-traveling slightly to reach a maximum displacement point 132. Due to the elasticity of the earth and the tug of vacuum 124, the earth subsequently rises to reach an extreme upward displacement 133. In practicing the invention, the second pattern of charges 107—112 is fired at this point causing an increase in pressure 125 shown in Fig. 7. Such pressure is applied over the areas 107a—112a shown in Fig. 8b lying directly below the correspondingly numbered charges. The shock waves set up by the latter charges, together with the high pressure gas resulting from the explosive, converge to interact upon one another at the center of the pattern. This results in the buildup of pressure over the region 140 shown in Fig. 8b. The latter area is rather large since all of the charges in the second group contribute to the effect. It is important to note that the pressure which is applied to the earth over the area 140 is not applied immediately following the explosion of the charges but at a slightly delayed time due to the fact that the wave fronts from the charges must travel about twice as far as was the case in the firing of the charges in the first group. The result of this is that the pressure on the earth extends over a full half cycle of earth movement, rising to a second peak 126 as shown in Fig. 7. While it is true that the average intensity is much reduced as compared to the first pressure impulse, the energy as indicated by the area under the curve will be approximately the same.

As a result of the prolongation of pressure, the earth is displaced downwardly from its maximum upward position 133 down to a position indicated at 134 in Fig. 7a. This movement will normally take place with slightly greater efficiency than may be attained by the charge arrangements previously discussed since energy is imparted to the earth at a somewhat lower intensity. This completes the formation of a well-shaped seismic wave and completes the setting up of two wave fronts properly spaced from one another in the earth. Such wave fronts travel downwardly through the weathered layer and into the underlying earth structure. During the course of such travel the intensity is equalized and the wave fronts remain substantially flat and directive in nature.

In the above discussion it has been assumed that the charges in the groups 100—106 and 107—112 respectively are spaced in accordance with the invention, the pressure on the earth being related to the velocity and displacement of the earth substantially as shown in Figs. 7 and 7a. The exact spacing between the charges within a group depends upon a number of factors including the type of explosive, the weight and arrangement in the charge, the placement of the cap, and the height above the earth. It is not possible therefore to set forth the spacing explicitly in a mathematical expression, nor is it practicable to include the various possibilities herein in graphical form. The spacing of the charges, may, however, be found by first preparing a worksheet consisting of a curve showing the observed location of the wave front relative to a given charge as a function of time. The spacing required to produce a collision after the desired time interval has elapsed may then be read directly and the charges spaced accordingly. Greater accuracy may, however, be achieved by setting up a group of charges 100—106 and by measuring the duration of the pressure which results upon firing them simultaneously. The latter data may be secured using conventional crystal pickup devices located at the surface of the earth at the region of impact of the wave fronts. Assuming that the pressure curve 120 of Fig. 7 represents the ideal condition, the duration of the initial pressure impulse may be increased by increasing the radial distance of the charges 101—106. Conversely, the duration may be decreased by moving the charges 101—106 inwardly toward the charge 100. With regard to the duration of the second pressure impulse indicated at 125 in Fig. 7, the duration may be adjusted in a completely analogous fashion until the illustrated optimum condition is achieved. The duration is increased or decreased by moving the charges 107—112 radially outward or inward respectively. It will be apparent therefore that the general arrangement of charges shown in Fig. 6 enables the duration of the two pressure impulses to be varied independently. With regard to the firing interval, any desired type of safe and accurate electrical interval timer may be employed. An example is shown more or less schematically at 145 in Fig. 9 where a free-falling weight W riding on a guide wire 146 comes into successive engagement with adjustable contacts 147 and 148 in the firing circuits of the two groups of charges. The time interval between such engagement, as previously stated, should be approximately three-fourths of the natural period of earth vibration settable on a calibrated scale.

*Simultaneous firing of vertically spaced charges*

The sequence firing of two charges each located a short distance above the earth has the advantage that relatively short poles may be used for supporting the charges and the setup time is reduced to a minimum. It will be understood by one skilled in the art, however, that the present invention is not necessarily so limited but would include in one of its aspects the simultaneous firing of charges in the air which are stacked one above the other with spacing between them coordinated in a novel manner with the natural period of the earth. Such an arrangement is disclosed in Fig. 10 where the first charge 150 is spaced a short distance, for example, 6 feet, above the earth. Arranged above the first charge and off to one side is a second charge 151 at a height $H_1$. If desired, even a third 152 charge may be employed which is spaced above the second charge at a height $H_2$ and offset with respect to the first two charges. For this purpose I prefer to use horizontal flat charges which may be in the shape of a disc having a thickness which is small as compared to the diameter. Charges of this type and the procedure for using the same are covered in my copending application Serial No. 29,307, filed May 26, 1948. As discussed in such application, charges of disc shape, when horizontally arranged and fired from the center, produce a shock wave which is directed for the most part downwardly with only a small part of the energy in the plane of the charge. If desired, a shield consisting of a layer of sand or the like may be placed over the top of the charge in order to direct still more of the explosive energy toward the earth. The shock wave emanating from the bottom of the charge spreads conically applying energy to the earth over a relatively broad but well-defined area and at a reduced intensity. Thus I make valuable use of certain transmission properties of the granules of which the weathered layer is composed and produce a rather flat seismic wave having high energy content.

In connection with the present invention, the first and second charges 150, 151 are offset from one another and fired simultaneously at a spacing such that the impacts successively applied to the earth are spaced by an interval corresponding to substantially three-fourths of the natural period of the earth vibration in the region under study. Such impacts result in the setting up of two seismic wave fronts in the earth which are spaced apart by a distance corresponding to one wave of a length most readily transmitted. This transformation occurs in substantially the same manner as discussed in connection with the sequential firing of the pattern in Fig. 4. The curve of pressure on the earth corresponds substantially to Fig. 5 except that the duration of the pressure may vary somewhat from that shown and the vacuum will be of lesser magnitude. However, the phase relation between the successive applications of pressure and the movement of the earth will be the same as that relationship pointed out between the curves of Figs. 5 and 5a.

Because the velocity of the shock wave falls off progressively as the wave travels through the air, it is not practicable to compute on a purely theoretical basis the height of the second charge relative to the first to set up wave fronts in the earth of the desired spacing. The spacing may instead be readily determined from a curve based upon observed velocity data. Such a curve is shown at 153 in Fig. 11, the height being indicated along the horizontal axis and the frequency of the resulting wave in the earth along the vertical axis.

It will be seen from an inspection of Fig. 13 that the charges 151 and 152 must be arranged at high elevations even for frequencies up to 60 or 70 vibrations per second which are about as rapid as any which may be encountered in oil geophysical work. This method of arranging and firing charges therefore has particular applicability in prospecting for certain ores where the depths are shallower and the natural frequencies much higher, on the order of 135 cycles per second.

The procedure for plotting the curve 153 will be clearly understood from the discussion which follows. First of all a preliminary worksheet is prepared giving in the form of a plot or curve the travel time of the shock wave as a function of the axial distance from the charge for the particular shape, weight and type of explosive charge which is to be employed. This data can be readily obtained by means of a test setup employing a series of crystal pickup devices spaced at increments along the extended axis of the charge. In the present example it will be assumed that the lower charge 150 will be at some convenient elevation, for example 6 feet.

The data used in plotting curve 153 in Fig. 11 may be arranged in tabular form as follows:

*Height data for simultaneously fired charges*

["First" charge 150 at height of 6 feet.]

| Frequency desired in the earth | A<br>Period desired in the earth, T | B<br>Period between 1st and 2nd impulses, 3/4 T | C<br>Transit time for lowest charge 150 (from plot) | D<br>Transit time for charge 151, B+C | E<br>Height H of "Second" charge 151 (from plot) | F<br>Period between 1st and 3rd impulses, A+B | G<br>Transit time for charge 152, F+C | H<br>Height $H_2$ of "Third" charge 152 (from plot) |
|---|---|---|---|---|---|---|---|---|
| | | | | | Feet | | | Feet |
| 20 C. P. S. | .05 | .0375 | .0006 | .0381 | 54.4 | .0870 | .0876 | 102.8 |
| 30 C. P. S. | .033 | .0248 | .0006 | .0254 | 40.6 | .0578 | .0584 | 76.8 |
| 40 C. P. S. | .025 | .0187 | .0006 | .0193 | 34.0 | .0437 | .0444 | 59.6 |

The frequencies desired in the earth are first listed along the left-hand edge, frequencies of 20, 30 and 40 cycles per second respectively being representative. These frequencies are inverted to obtain the period T of the desired seismic wave set forth in column A. Such periods are then multiplied by the ratio 3/4 to obtain the interval between the first and second impulses on the earth given in column B. The transit time for the shock wave from the charge 150 at an elevation of 6 feet is read from the preliminary plot and repetitively tabulated in column C. Addition of columns B and C results in the transit times for the charge 151 set forth in column D. Referring again to the preliminary plot, a height corresponding to each transit time is read off directly and listed in column E. In the present instance it will be apparent that with the charge 151 at elevations of 54.4, 40.6 and 34.0 feet respectively, seismic frequencies of 20, 30 and 40 cycles per second will be set up. This defines three points on the curve 153 and such procedure is repeated for other seismic frequencies to obtain additional points.

In accordance with a more detailed aspect of the invention a third charge 152 is fired to add in-phase energy to the earth. The third charge is arranged at a height such that the interval between the impulses produced by the charges 151, 152 will correspond to the period of vibration most readily transmitted by the earth. The height of the charge 152 as a function of seismic frequency is given by the curve 154 of Fig. 11. This curve is plotted in accordance with data obtained in the table set forth above. First of all, the desired period T in the earth is added to the period between the first and second impulses on the earth to obtain the interval between the first and third impacts. Simply stated, the figures in columns A and B are added to produce the sums set forth in column F. To these are added the transit time from the charge 150 obtained from column C to produce the transit times for the charge 152 listed in column G. The figures thus obtained are then used in the preliminary plot to determine the corresponding height of the charge 152 above the earth. This information is set forth in column H along the right-hand edge of the table. Having defined three points on the curve 154, additional points may be obtained using the same procedure.

When using the setup shown in Fig. 10 in the field it is sufficient merely to observe the frequency of the wave most readily transmitted by the earth in the region under study as indicated by a test shot or by observing prior traces recorded in the same region. Reference is then made to a graph of the type set forth in Fig. 11 from which the heights of the charges 151, 152 required to produce such seismic frequency may be read off directly. The charges are offset laterally from one another as shown so that the interference between the simultaneously produced shock waves may be kept to a minimum. The charges should, however, be kept sufficiently close so that they act on adjacent areas of the earth's surface with a certain amount of overlapping between them. It will be apparent that additional charges of the same type may be fired at the same elevation to augment the action of the single charges 150, 152, provided each charge is offset from the charges lying above or below.

In the embodiments of the present invention previously discussed it has been found that best results are obtained by supporting the charges at an elevation lying in a range of approximately 5 to 20 feet and by spacing the simultaneously fired charges closely enough together so that the pressure at the surface is substantially as high between the charges as under them. It is recognized that in Fig. 11 the heights of the charges, and particularly the third charge 152, are greater than 20 feet. As a result, the areas of the earth's surface acted upon by charges falling within the right-hand portion of the curves of Fig. 11 will not be as well defined as when the left-hand portions of these curves are employed. Consequently the setup illustrated in Fig. 10 should not be considered the preferred form of the invention but rather one which has particular utility in prospecting for ore and for work in other regions where the natural frequency of the earth is much higher than average.

It is readily possible to remove the shot point from the geophone spread by a horizontal distance great enough as compared to the vertical elevation of the charge so that the reflected energy reaches the geophone spread before the air wave does. Consequently, first arrivals are of very low amplitude and the automatic volume control or the expander circuit can easily handle the full range of energy level. No preset suppressor is required and the early parts of the record are left free from the usual distortion caused by tripping the suppressor. As a result cleancut reflections and refractions usually appear very early on the record.

Regardless of which of the modifications is used, the usual shot hole drilling equipment and accessories are entirely eliminated. This feature offers exceptional advantages in foreign countries as well as in other areas which are difficult to reach with heavy equipment. Since no drilling equipment is needed, the operating procedure is made more flexible and fast moving, and the shooting party can work more closely, or even be combined, with the surveying party. If it is found that additional shot points are desired, they can be introduced without having each of the three groups return to that point. Several shots can be made at the same point with perfect reproducibility and without encountering what is known as hole fatigue wherein successive records differ widely even though identical charges are loaded in exactly the same manner in a shot hole.

Test shots made in cultivated areas show that very little permanent damage is incurred by the plant life on the surface immediately below the elevated charges. Experiments to date employing the techniques disclosed herein for underwater prospecting indicate that no damage to fish and marine life results from the energy set up in the water by detonating the charges suspended above the water by floating buoys. While the noise is somewhat greater than accompanies the firing of an equivalent amount of charge in the ground, nevertheless the possibility of damage to buildings and other structures is much less than that caused by the shear wave or "ground roll" in conventional shooting techniques.

From an economic standpoint the savings in time and cost to drill shot holes ahead of the seismograph crews, together with the elimination of the drilling and accessory equipment, enable the cost per mile of subsurface information to be reduced substantially below that incurred in the past.

In the claims the natural period of the earth shall be taken to mean the period corresponding to the frequency most readily transmitted along the path of the reflection reaching the geophone spread. The term "neighboring areas" shall be understood to refer to shot areas which are sufficiently close together so that the seismic waves from each of them are received as a composite wave at a common pick-up point after reflection from the same surface of a submerged horizon. The term includes overlapping and coincident areas as well as areas which are separated from one another.

I claim as my invention:

1. The method of seismic exploration which includes the steps of applying to the earth two successive impulses at neighboring areas and spaced from one another in time by an interval substantially equal to three-fourths of the natural period of earth vibration in the region under study, and receiving the seismic wave resulting therefrom after the same has been transmitted through the earth.

2. The method of seismic exploration which includes the steps of applying to the earth over a broad but well-defined area two successive impulses spaced from one another by an interval substantially equal to three-fourths of the natural period of earth vibration in the region under study, and receiving the seismic wave resulting therefrom after the same has been transmitted through the earth.

3. The method of seismic exploration which includes the steps of arranging first and second charges of explosives at neighboring areas above the surface of the earth, firing the charges in timed sequence separated by an interval substantially equal to three-fourths of the natural period of earth vibration characteristic of the region, and then receiving the resulting seismic wave after it has been transmitted through the earth.

4. The method of seismic exploration which includes the steps of arranging a first charge of explosive above the surface of the earth and sufficiently close thereto so that upon explosion thereof an impulse is applied over a broad but well-defined area below the charge with the intensity level such that a seismic wave is efficiently transmitted through the loose granular surface material, arranging a second charge similarly to the first charge and in the vinicity thereof yet spaced from the first charge by an amount sufficient to avoid the possibility of countermining, firing the first charge, firing the second charge after an interval which is substantially equal to three-fourths of the natural period of earth vibration in the region under study, and then receiving the resulting seismic wave after it has been transmitted through the earth.

5. The method of seismic exploration which includes the steps of arranging a group of explosive charges laterally spaced from one another above the surface of the earth at such height that the products of detonation are effective to apply force to the earth under the group yet sufficiently removed from the earth so that there is no shattering of earth structure, arranging a second group of charges in the region of said first group and at substantially the same height with the charges of the second group spaced far enough away from the charges of the first group as to avoid the possibility of countermining when the groups of charges are fired in sequence, firing said first group of charges simultaneously and then firing said second group of charges simultaneously after a time interval which is equal to substantially three-fourths of the natural period of vibration of the region under study, and then receiving the resulting seismic wave set up in the surface of the earth.

6. The method of seismic exploration which includes steps of arranging a group of elongated charges vertically above the earth and laterally spaced from one another with the spacing and elevation such that upon firing these charges simultaneously the area of the earth directly below the charges will be directly acted upon by the products of the explosion, arranging a second group of such charges vertically above the earth and laterally spaced from one another in the same general area covered by said first group but with the charges of the second group spaced sufficiently from the charges of said first group as to avoid the possibility of countermining, firing said first group of charges simultaneously, firing said second group of charges simultaneously after a time interval substantially equal to three-fourths of the natural period of earth vibration in the region under study, and then picking up the resulting seismic wave produced in the earth after such wave has been reflected from a submerged horizon.

7. The method of seismic exploration which includes the steps of arranging a group of charges at the same height above the surface of the earth and spaced sufficiently closely to one another that upon simultaneous firing thereof the pressure exerted upon the earth in the area covered by the group is substantially as high in the region between the charges as it is at points directly under the charges so that a piston-like thrust is applied to the earth, arranging a second pattern of charges at substantially the same height and spacing and in the same general region as the first pattern but with the charges of said second group sufficiently spaced from the charges of said first group so as to avoid the possibility of countermining, firing said first and second groups of charges in sequence and spaced apart by an interval which is substantially equal to three-fourths of the natural period of vibration of the earth in the region under study, and then picking up the resulting seismic disturbance after it has been transmitted through the earth.

8. A seismic array comprising a first ring of explosive charges arranged equidistant from one another and at the same height above the earth, means for firing said first ring of charges simultaneously, a second ring of charges spaced equidistant from one another above the surface of the earth and concentric with said first ring of charges yet spaced from said first ring at a sufficient distance as to avoid the possibility of countermining, means for firing said second ring of charges simultaneously, and means for accurately delaying the firing of said second ring of charges after the firing of said first ring by a time interval which is substantially equal to three-fourths of the natural period of earth vibration in the region under study to produce a well-defined complete wave of earth vibration for seismic purposes.

9. The method of a seismic exploration which includes the steps of arranging first and second charges of explosive above the earth and horizontally offset from one another and with the vertical spacing between the charges such that upon simultaneous firing thereof the earth is subjected to successive pressure impulses which are spaced apart by an interval substantially equal to three-fourths of the natural period of earth vibration in the region under study, firing said charges to produce two successive wave fronts in the earth, and receiving the wave fronts at a remotely located recording unit after reflection from a submerged horizon.

10. The method of seismic exploration which includes the steps of arranging first and second vertically stacked charges of explosive above the earth with the vertical spacing between the charges such that upon simultaneous firing thereof the earth is subjected to successive pressure impulses which are spaced apart by an interval substantially equal to three-fourths of the natural period of earth vibration in the region under study, firing said charges to produce two successive wave fronts in the earth, and receiving the wave fronts at a remotely located recording unit after reflection from a submerged horizon.

11. The method of seismic exploration which includes the steps of arranging first and second charges of explosive above the earth at neighboring areas horizontally offset from one another and with the vertical spacing between the charges such that upon simultaneous firing thereof the earth is subjected to successive pressure impulses producing two successive seismic wave fronts separated by a distance corresponding to the seismic wavelength most readily transmitted by the earth in the region under study, firing said charges simultaneously, and receiving the wave fronts at a remotely located recording unit after reflection from a submerged horizon.

12. A charge array for setting up a seismic wave in the earth comprising a first explosive charge so constructed and oriented that a wave front having a relatively flat central portion is projected downwardly into contact with the earth upon firing the charge, a second exposive charge similar to the first and arranged above and to one side of the first exposive charge so that the wave front projected downwardly therefrom acts upon an adjacent but overlapping area of the earth's surface, means for firing the charges simultaneously, the vertical spacing between the charges being such that the shock waves therefrom strike the earth with an interval between them substantially equal to three-fourths of the natural period of vibration of the earth.

13. A charge array for setting up a seismic wave in the earth comprising first and second explosive charges arranged one above the other, said charges each having an extensive flat surface facing toward the earth so that upon firing a wave front having a relatively flat central portion is projected downwardly for impact with the earth, said second charge being horizontally offset over a neighboring area relative to the first so that the wave front therefrom may pass to the earth relatively unimpeded, means for firing the charges simultaneously, the vertical spacing between the charges being such that the seismic waves set up in the earth are spaced apart an amount corresponding to the wavelength of seismic vibration most readily transmitted by the earth in the region being explored.

14. A charge array for setting up a seismic wave in the earth comprising first, second and third explosive charges so constructed and oriented above the earth that a wave front having a relatively flat central portion is projected downwardly into contact with the earth from each of the charges upon detonation thereof, said first charge being arranged above the surface of the earth to apply an impact thereto over a broad but fairly well-defined area, said second explosive charge being arranged above and to one side of the first explosive charge so that the wave front projected downwardly therefrom acts upon an adjacent and overlapping area of the earth's surface, said third charge being arranged above and to one side of said first two charges so that the wave front therefrom acts upon another adjacent and overlapping area, means for firing the charges simultaneously, the heights of the charges being such that the shock wave from the second charge strikes the earth after an interval substantially equal to three-fourths of the natural period of vibration of the earth and so that the shock wave from the third charge strikes the earth after an interval substantially equal to said natural period of vibration.

15. An arrangement for setting up a seismic wave in the earth comprising in combination a first group of charges arranged above the surface of the earth, said first group including a central charge and a ring of spaced charges arranged at an equal radius from the central charge, the radius being such that upon simultaneous firing of the charges in the group an impulse is applied to the earth having a duration of substantially one-fourth of the period of vibration most readily transmittted by the earth, a second group of charges arranged in a ring concentrically with said central charge and interspersed between the charges in the first group and separated therefrom by an amount sufficient to avoid countermining, the radius of the second ring of charges being sufficiently great so that the impulse applied to the earth upon simultaneous firing thereof has a duration of substantially half of the natural period of earth vibration, and means for firing said groups of charges in sequence with a firing interval substantially equal to three-fourths of the natural period of earth vibration for the production of a well-formed and efficiently transmitted seismic wave in the earth.

16. An arrangement for setting up a seismic wave in the earth comprising in combination a first group of charges arranged above the surface of the earth, said first group including charges so spaced from one another that upon simultaneous firing thereof an impulse is applied to the earth having a duration of substantially one-fourth of the period of vibration most readily transmitted by the earth, a second group of charges arranged above the surface of the earth in the region of said first group but with the respective charges sufficiently isolated from the charge in the first group to avoid countermining, the spacing between the charges of the second group being such that the impulse applied to the earth upon simultaneous firing thereof has a duration of substantially half of the natural period of earth vibration, and means for firing said groups of charges in sequence with a firing interval substantially equal to three-fourths of the natural period of earth vibration.

17. The method of seismic exploration which includes the steps of arranging a group of explosive charges laterally spaced from one another parallel to the surface of the earth at a height in the range of five to twenty feet, arranging a second group of charges in the region of said first group at a height within the same range, the charges of the second group being spaced far enough away from the charges of the first group as to avoid the possibility of countermining when the first group is fired, firing said first group of charges simultaneously and then firing said second group of charges simultaneously after a time interval which is equal to substantially three-fourths of the natural period of vibration of the earth in the region under study, and then receiving the resulting seismic wave set up in the surface of the earth.

18. The method of seismic exploration which includes the steps of arranging a pattern of explosive laterally spaced from one another above the surface of the earth at a height within the range of five to about twenty feet, arranging a second pattern of explosive in the region of said first pattern and at substantially the same height as the explosive of the second pattern and spaced far enough away from that of the first pattern so as to avoid the possibility of countermining when the patterns are fired in sequence, firing said first pattern and then firing said second pattern after a time interval which is equal to substantially three-fourths of the natural period of vibration of the earth in the region under study, and then receiving the resulting seismic wave set up in the surface of the earth.

19. A setup for seismic exploration which includes a first group of charges arranged in a symmetrical two-dimensional pattern above the earth at a height in the range of five to about twenty feet so that upon firing these charges simultaneously the area of the earth below the charges will be subjected to an impact, a second group of charges arranged in a pattern above the earth at a height within the same range and over the same general area covered by said first group but with the charges of the second group spaced sufficiently from the charges of said first group so as to avoid the possibility of countermining, means for firing said first group of charges simultaneously, means for firing said second group of charges simultaneously after a time interval substantially equal to three-fourths of the natural period of earth vibration in the region under study, and means for picking up the resulting seismic wave produced in the earth after such wave has been reflected from a submerged horizon.

20. A setup for seismic exploration which includes a first pattern of charges symmetrically spaced from one another above the earth at a height in the range of five to twenty feet, a second pattern of charges arranged concentrically with respect to said first pattern but with the charges of the second pattern spaced sufficiently from the charges of said first pattern as to avoid the possibility of countermining, means for firing said first pattern of charges simultaneously and then firing said second pattern of charges simultaneously after a time interval substantially equal to three-fourths of the natural period of earth vibration in the region under study, and means for picking up the resulting seismic wave produced in the earth after such wave has been reflected from a submerged horizon.

THOMAS C. POULTER.

REFERENCES CITED

The following references are of record in the file of this patent:

UNITED STATES PATENTS

| Number | Name | Date |
| --- | --- | --- |
| Re. 17,242 | McCollum | Mar. 19, 1929 |
| 1,899,970 | McCollum | Mar. 7, 1933 |
| 1,998,412 | Prescott | Apr. 16, 1935 |
| 2,064,451 | Voorhees | Dec. 15, 1936 |
| 2,156,198 | Scherbatskoy | Apr. 25, 1939 |
| 2,320,248 | Shimek | May 25, 1943 |

FOREIGN PATENTS

| Number | Country | Date |
| --- | --- | --- |
| 701,747 | France | Mar. 21, 1931 |